F. A. COLES.
AUXILIARY AIR INTAKE VALVE.
APPLICATION FILED AUG. 30, 1917.

1,264,775.

Patented Apr. 30, 1918.

F. A. Coles
Inventor

By Geo. P. Kimmel
Attorney

UNITED STATES PATENT OFFICE.

FREDERICK A. COLES, OF MIAMI, FLORIDA.

AUXILIARY AIR-INTAKE VALVE.

1,264,775.   Specification of Letters Patent.   Patented Apr. 30, 1918.

Application filed August 30, 1917. Serial No. 188,959.

*To all whom it may concern:*

Be it known that I, FREDERICK A. COLES, a citizen of the United States, and resident of Miami, in the county of Dade and State of Florida, have invented certain new and useful Improvements in Auxiliary Air-Intake Valves, of which the following is a specification.

This invention relates to new and useful improvements in attachments for internal combustion engines, and the primary object of the invention is to provide an auxiliary air intake valve, adapted to be connected with the intake manifold of the gas engine, so as to feed heated air thereto when the engine is running, to reduce the amount of gasolene necessary to operate the same, thereby affording a great saving by reducing the amount of fuel necessary to operate the engine to a minimum.

Another object of the invention is to provide an auxiliary air intake valve of this character, which is adapted to be applied to the intake manifold of an internal combuston engine used to operate an automobile, said valve having means for controlling the amount of air passing therethrough, from the dashboard of the automobile, so that various amounts of air may be fed to the intake, according to the amount found most practical.

A still further object of the invention is to provide an auxiliary intake valve of this character, that takes the air from around the exhaust of the internal combustion engine, said air being heated thereby, and then fed to the intake manifold, permitting the gasolene feed to be reduced thereby affording a great saving in the consumption of fuel during the operation of the engine.

Still another object of the invention is to provide a device of this character, which is easily and simply constructed, inexpensive to manufacture, and one which will be very efficient in operation.

With these and numerous other objects in view, my invention consists of the novel features of construction, combination, and arrangement of parts which will be herein referred to and more particularly pointed out in the specification and claims.

In the accompanying drawings:—

Figure 1:
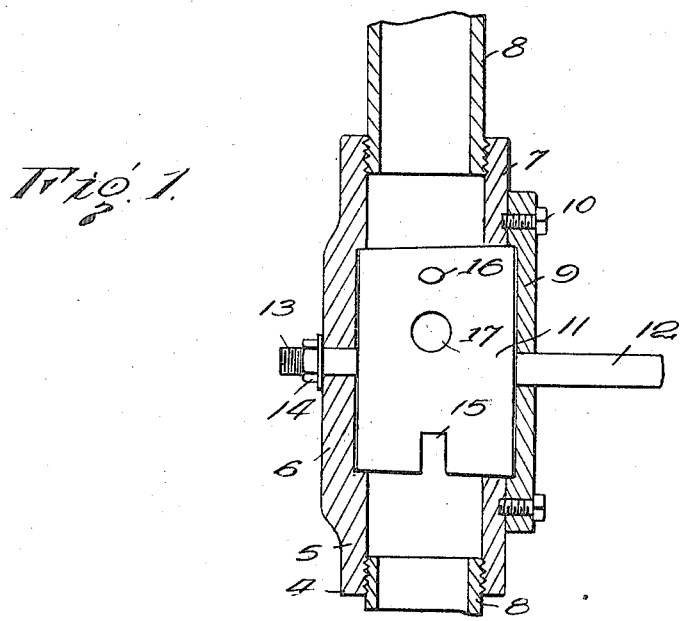
Figure 2:
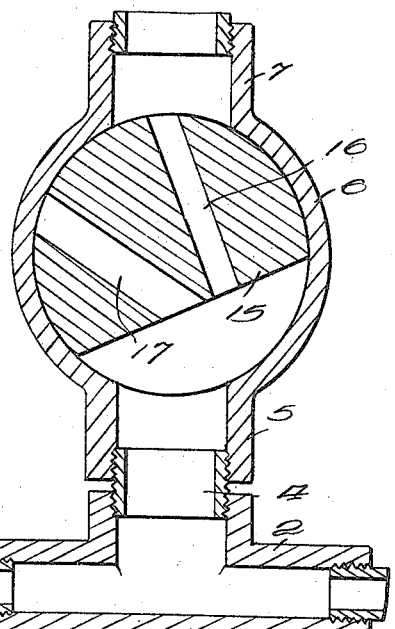

Figure 1 is a longitudinal vertical section through the valve, showing valve body in elevation; and Fig. 2 is a longitudinal horizontal section through the valve, showing the connection of the same with the intake manifold of an internal combustion engine.

In describing my invention, I shall refer to the drawings in which similar reference characters designate corresponding parts throughout the several views.

The numeral 1 designates the intake manifold of an internal combustion engine, said manifold having positioned adjacent thereto a supplemental air manifold 2, having its opposite ends opened, and connected with the branches of the intake manifold of the engine, as shown at one end, and designated by the numeral 3. The air manifold 2 is connected by a short length pipe 4, with the outlet port 5, of a valve casing 6. The inlet 7 of said valve casing is connected with a pipe 8, that extends to a point adjacent the exhaust manifold of an engine, so that the air taken into the same will be heated by being circulated around said exhaust. Various means may be employed to heat the air before feeding the same to the intake pipe of the auxiliary device, but preferably the air is heated by circulating around the exhaust casing, said means being the simplest and most practical in the application of the device for use on an internal combustion engine used to operate an automobile.

The valve casing 6 is circular, and is provided with a removable portion 9, held thereon by screws 10. The valve casing 6 has formed therein when the top is in position, a recess or pocket, adapted to receive a cylindrical valve body 11, which is rotatably mounted in said pocket, said valve being mounted on an axis formed by a stem 12 projecting through the top 9, an alining projecting portion 13 extending through the bottom of said casing, and having a locking nut and washer 14 on the projecting end thereof, which is externally threaded to receive these parts. The valve stem 12, is connected by any means, with the dashboard of the automobile, when the device is so applied, so that it may be within easy reach of the operator of the machine, so as to control the amount of air passing through the auxiliary air intake, or to close the same entirely when so desired.

The cylindrical valve body 11, has a segment removed therefrom, to form a flat side 15, adapted for alinement at times with the outlet port 5 in the valve casing. Disposed in a single horizontal plane with the recess formed by the removal of this segmental portion, are a pair of diverging different size ports 16 and 17, which communicate with the recess so formed, and have their outer ends extend to the outer wall of the valve body, adapted for successive communication with the inlet port 7 in the valve casing. By this construction, it is obvious that either the ports 16 or 17 may be disposed so as to communicate with the inlet 7, and it is obvious that when either of the same are so disposed, the recess and flat side 15 in the valve body, will communicate with the outlet port 5, and as the passages 16 and 17 communicate with said flat side, the passage of air through the valve may be controlled accordingly. It is also obvious that the valve may be so rotated, as to close the intake entirely.

In operation when the auxiliary air intake valve is in position, as clearly shown in Fig. 2 of the drawings, the smaller port 16 in the valve body is in alinement with the inlet and outlet ports of the casing, and it is obvious that air drawn through the inlet, from the pipe 8, said air being heated as has been fully described, will be fed to the air manifold 2, and hence through the connections 3 to the intake manifold 1 of the gas engine. As the operation of the valve stem 12 is controlled from the dashboard of the automobile, it is obvious that when more heated air is desired, the valve is rotated, so that the port 17 which is the larger port is brought into operation, and more air will consequently be fed through the intake. If desired the valve may be so rotated as to entirely close the passage through the casing, to cut off the supply of air, when such is necessary, for instance when starting the engine. After the engine has been started and thoroughly heated, the amount of gasolene fed to the carbureter may be reduced, and the auxiliary air intake operated, so as to permit heated air to be fed to the mixture in the intake. The operation of this device will greatly reduce the consumption of gasolene necessary to operate the engine, thereby creating a great saving and reducing the expense of operating the engine.

From the above description taken in connection with the accompanying drawings, it is thought that a clear and comprehensive understanding of the construction, operation, and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

1. In a device of the class described, the combination with an intake manifold of an internal combustion engine, of an air inlet pipe connected therewith, a valve casing in said pipe, a cylindrical rotatable valve body in said casing, said body having a segment removed to form a recess having a flat side for alinement with the outlet port, and a pair of diverging different sized passages in said body in communication with the flat side adapted for alinement at different times with the inlet of the valve casing.

2. In a device of the class described, the combination with an intake manifold of an internal combustion engine, of an air inlet pipe connected therewith, a valve casing in said pipe having alining inlet and outlet ports, a cylindrical rotatable valve body in said casing, said body having a pair of different sized passages therethrough each with one of its ends adapted to communicate continuously with the outlet port of the valve casing, and means to rotate said valve body whereby the opposite ends of the passages are adapted for successive communication with the inlet port of said valve casing.

In testimony whereof, I affix my signature hereto.

FREDERICK A. COLES.

Copies of this patent may be obtained for five cents each, by addressing the "Commissioner of Patents, Washington, D. C."